3,778,466
METHOD FOR MANUFACTURE OF 3-PENTENOIC ACID ESTER

Akio Matsuda, Kashiwa, Japan, assignor to Agency of Industrial Science & Technology, Tokyo, Japan
No Drawing. Filed Apr. 5, 1972, Ser. No. 241,452
Claims priority, application Japan, June 18, 1971, 46/43,323
Int. Cl. C07c 69/54
U.S. Cl. 260—486 AC     4 Claims

ABSTRACT OF THE DISCLOSURE

An ester of 3-pentenoic acid is produced by allowing butadiene, carbon monoxide and an alcohol to react in isoquinoline as the solvent in the presence of cobalt carbonyl as the catalyst. Isoquinoline has low toxicity, a high boiling point and a low solubility with respect to paraffins. Thus, it proves to be a convenient solvent in the distillation and extraction treatments needed for the isolation of the 3-pentenoic acid ester from the reaction mixture. The catalyst and the solvent both can be used cyclically in the present operation.

---

This invention relates to a method for the manufacture of 3-pentenoic acid esters from butadiene, carbon monoxide and alcohols. In the method of this invention, the catalyst and the solvent constitute important factors in the reaction involved. In a method conventionally known to the art it is claimed, for example, that a palladium complex or rhodium compound functions as an excellent catalyst and pyridine as an excellent solvent. However, there has not yet been developed a technique which permits this method to safely obtain the product in a high yield on a commercial scale.

In the reaction using a palladium complex as the catalyst and methanol as the solvent, the 3-pentenoic acid ester is obtained in a relatively low yield of about 60–70% based on butadiene. Moreover, the palladium complex used therein is required to be in the form of a phosphine complex of palladium halogenide such as, for example, expensive $(Bu_3P)_2PdCl_2$. Thus, this method has not so far developed to a commercializable level. In the method described in U.S. Pat. 3,161,672, there is used a rhodium catalyst. This method is not practicable in that rhodium is more expensive than cobalt and that the yield of pentenoic acid ester is at the most on the order of 50%. In another method of recent development, cobalt carbonyl is used as the catalyst and pyridine as the solvent respectively. Cobalt carbonyl is far less expensive than palladium or rhodium compounds and, therefore, proves more practical. Nevertheless, pyridine has high volatility and heavy toxicity. The separation of the product from pyridine is not easy to accomplish. This method, therefore, has a disadvantage in that separation must rely on precision distillation.

It is the main object of this invention to provide a method for manufacturing, safely and in an extremely high yield, a 3-pentenoic acid ester usable as a raw material for the production of an adipic ester which serves as a starting material for the production of polyesters, polyamides, and plasticizers. In addition, 3-pentenoic acid esters find a wide range of applications to the production of polymers. It is another object of this invention to provide a method suitable for commercial operation, wherein the solvent and the catalyst can be used cyclically.

To be specific, this invention relates to a method for manufacturing 3-pentenoic acid esters, which comprises allowing butadiene, carbon monoxide and alcohols to react in isoquinoline as the reaction solvent in the presence of cobalt carbonyl as the catalyst.

The present invention further relates to a method for the manufacture of a 3-pentenoic acid ester, which comprises subjecting the aforesaid reaction product to extraction with a paraffin thereby obtaining an extracted phase containing the greater part of the produced 3-pentenoic acid ester and a minor fraction each of cobalt carbonyl and isoquinoline and a separated phase containing the greater part each of cobalt carbonyl and isoquinoline and a minor fraction of the produced 3-pentenoic acid ester, fractionally distilling the extracted phase to isolate 3-pentenoic acid ester therefrom, adding the separated phase together with a residue resulting from the distillation of the extracted phase and therefore containing therein cobalt carbonyl and isoquinoline to a new supply of reactants, and subjecting the resultant mixture to reaction, whereby the production of 3-pentenoic acid ester is continued while the catalyst and the solvent are put to use cyclically.

The present invention relates also to a method for the manufacture of a 3-pentenoic acid ester, wherein the aforesaid reaction product is subjected to vacuum distillation at a temperature below 50° C., for example, at normal room temperature to isolate the unaltered alcohol and the produced 3-pentenoic acid ester fractionally and, at the same time, obtain cobalt carbonyl and isoquinoline as the distillation residue, whereby the recovered cobalt carbonyl and isoquinoline will be used cyclically for the purpose of the reaction.

This invention relates to a method for the manufacture of a 3-pentenoic acid ester from carbon monoxide, an alcohol and butadiene by using cobalt carbonyl as the catalyst and isoquinoline as the solvent.

The alcohols usable for this manufacture include methanol, ethanol, propanol and butanol. The esters obtained as products are, therefore, the methyl ester, ethyl ester, propyl ester and butyl ester respectively of 3-pentenoic acid. Of these products, the methyl ester finds the most useful application and, therefore, has particular importance from the industrial point of view.

The esters of 3-pentenoic acid are unsaturated esters and, therefore, are polymerizable. Thus, polymers can be obtained from these esters. The esters, upon reaction with carbon monoxide and alcohols, may be converted into adipic acid esters which are useful as starting materials for the production of polyesters, polyamides, plasticizers, etc.

As already mentioned, there has been suggested a method which has striking resemblance to the method of this invention. This method comprises allowing butadiene, carbon monoxide and an alcohol to react while using cobalt carbonyl as the catalyst and pyridine as the solvent. In the case of the reaction using pyridine, the yield of 3-pentenoic acid ester is 90% with reference to butadiene. The reaction velocity in this case is equal to that which is obtained by the reaction of the present invention using isoquinoline as the solvent. Pyridine, however, has high toxicity and a low boiling point of 115° C. Consequently, it is not easy to effect efficient and economical separation of pyridine from the reaction mixture in which pyridine is present.

The method of the present invention excels the aforesaid method using pyridine as the solvent in that it provides improvements with respect to the drawback inevitably entailed by the use of pyridine. The inventors carried out a study and conducted experiments on various substances in search for a solvent which behaves better than pyridine. As a result, they have reached the conclusion that isoquinoline is most suitable for the purpose.

Isoquinoline is far less toxic than pyridine and has a higher boiling point of 240° C. Therefore, the separation of this solvent from the reaction mixture can be effected easily. What is more, the yield of 3-pentenoic acid ester based on butadiene is very high and favorably comparable with that obtained by using pyridine.

The solubility of isoquinoline with respect to paraffins such as cyclohexane and petroleum ether which are used as solvents for extraction is lower than that of pyridine. Accordingly, the use of isoquinoline has an advantage that the separation of this solvent from the produced 3-pentenoic acid ester is accompilshed more easily.

The 3-pentenoic acid ester may be satisfactorily separated from the reaction mixture in a favorable yield on a commercial scale by using any ordinary means. Particularly by employing the procedure described below, the 3-pentenoic acid ester can be obtained in a high yield efficiently on a commercial scale without entailing any loss of catalyst or solvent.

The procedure especially suitable for the purposes of this invention is described with respect to an example wherein methyl alcohol, butadiene and carbon monoxide are allowed to react by using isoquinoline as the solvent and dicobalt octacarbonyl as the catalyst and the produced methyl ester of 3-pentenoic acid is separated from the resultant reaction mixture.

First, an autoclave is charged with butadiene, methyl alcohol, isoquinoline and dicobalt octacarbonyl. Under the pressure of carbon monoxide gas, the contents of the autoclave are heated and agitated. The relationship between heating temperature, pressure and reaction time used in this treatment is shown in the following table.

By treating the reaction mixture as described below, the produced 3-pentenoic acid ester can be obtained and, at the same time, the solvent and the catalyst can be put to reuse without loss:

The unaltered alcohol and the produced 3-pentenoic acid ester are fractionally distilled by subjecting the reaction mixture to vacuum distillation at a temperature not exceeding 50° C. As the residue of this distillation, there is obtained dicobalt octacarbonyl in its undecomposed form together with isoquinoline. The catalyst and the solvent, when recovered, may be used again as raw materials for the reaction.

Both isoquinoline and dicobalt octacarbonyl can be recovered in their entirety (100%) and put to reuse. Thus, this method proves highly advantageous from the commercial point of view. As will be demonstrated in working examples to be given hereafter, this method is very practical in that it produces absolutely no waste.

In the procedure mentioned above, the catalyst used may be any cobalt compound so long as it produces dicobalt octacarbonyl in the course of reaction. In the starting reactants, therefore, the catalyst need not be limited to dicobalt octacarbonyl.

The alcohols which are usable for the present reaction include ethyl alcohol, propyl alcohol and butyl alcohol. These alcohols are allowed to undergo reaction under practically the same conditions to produce ethyl ester,

| Concentration of catalyst per butadiene (mol percent) | Heating temperature (° C.) | Pressure (atm.) | Reaction time (hr.) | Conversion of butadiene (percent) | Yield of 3-pentenoic acid ester from converted butadiene (percent) |
| --- | --- | --- | --- | --- | --- |
| 5 | 120 | 200 | 3.5 | 91 | 82 |
| 5 | 140 | 300 | 2 | 92 | 85 |
| 10 | 120 | 300 | 1.5 | 92 | 92 |
| 4 | 140 | 300 | 3 | 87 | 90 |
| 4 | 100 | 300 | 18 | 63 | 93 |
| 4 | 100 | 200 | 18 | 66 | 97 |
| 4 | 100 | 150 | 18 | 63 | 94 |
| 4 | 100 | 100 | 18 | 45 | 95 |

From the preceding table, it is clear that the standard reaction conditions are 120 to 140° C. of temperature and 200 to 300 atmospheres of pressure. Where the reaction temperature is low, for example, on the level of 100° C., the yield of 3-pentenoic acid ester from the converted butadiene is greater than where the reaction temperature is higher. Yet, the reaction under these conditions must be continued for as long as 18 hours to bring the conversion of butadiene to the level of 60%. Thus, this reaction proves to be inefficient.

After completion of the reaction, the reaction mixture is removed from the autoclave and then treated as follows.

This reaction mixture is subjected to extraction using a paraffin such as petroleum ether or cyclohexane. The resultant extraction phase contains the greater part of the produced methyl 3-pentenoate and a minor fraction each of isoquinoilne and dicobalt octacarbonyl, while the separated phase contains the greater part each of isoquinoline and dicobalt octacarbonyl and a minor portion of the methyl 3-pentenoate.

From this extracted phase the desired highly pure ester of 3-pentenoic acid can be separated by distillation. The extractant can also be recovered in a high purity by distillation. The recovered extractant may be put to reuse.

The residue resulting from the distillation of the extracted phase is a black, viscous liquid. It contains a small fraction each of isoquinoline and dicobalt octacarbonyl which has been partially decomposed and consequently inactivated by the heat applied at the time of distillation. Thus, this residue may be mixed with the separated phase and used in the subsequent cycle of reaction.

The dicobalt octacarbonyl deprived of activity is consequently reactivated to a reusable condition.

propyl ester and butyl ester respectively of 3-pentenoic acid.

Stoichiometrically, butadiene and an alcohol react with each other at the ratio of 1 mol to 1 mol. Preferably, the alcohol may be used in an amount slightly in excess of this ratio to increase the conversion of butadiene. In the reaction, butadiene partly underoges dimerization to give rise to about 10% of 4-vinyl-1-cyclohexene.

Now, the present invention is described with reference to working examples. This invention is not in any way limited to these examples.

EXAMPLE 1

An autoclave made of stainless steel, having a capacity of about 300 cc. and fitted with an agitator was charged with 0.389 mol of butadiene, 0.5 mol of methanol, 0.25 mol of isoquinoline and 0.04 mol of dicobalt octacarbonyl as the catalyst. Under a pressure of 300 atmospheres of carbon monoxide, the contents of the autoclave were allowed to react at 120° C. for 1.5 hours, with an electromagnetic vertical agitator operated to stir the contents at a rate of 80 vertical vibrations per minute. Consequently, there was obtained 88 g. of reaction mixture. When this reaction mixture was assayed by gas chromatography, it was found to comprise 43% of produced methyl 3-pentenoate, 1.3% of unaltered butadiene and 6.2% of unaltered methanol. The residual gas remaining in the reactor was passed through methanol cooled with dry ice and then assayed by gas chromatography. Consequently, it was found that, 0.01 mol of the unaltered butadiene was remaining in the gaseous phase.

From the preceding results, it is seen that the conversion of butadiene was 92% and the yield of the methyl ester of 3-pentenoic acid based on butadiene was 85%, indicating that the selectivity of butadiene to the methyl ester of 3-pentenoic acid was 92%.

When the whole reaction mixture was subjected to extraction using 50 cc. of cyclohexane, it was divided into two layers, one on top of the other. The upper layer which was a cyclohexane phase weighing 72 g. comprised 67% of the formed methyl 3-pentenoate and a small fraction each of the used isoquinoline and dicobalt octacarbonyl. The lower layer which weighed 54 g. comprised 33% of the produced methyl 3-pentenoate and a major portion each of the used isoquinoline and dicobalt octacarbonyl.

When the upper layer was distilled, there were obtained 25 g. of highly pure methyl 3-pentenoate, 46 cc. of cyclohexane and 11 g. of distillation residue.

The distillation residue contained dicobalt octacarbonyl, isoquinoline and ester of 3-pentenoic acid.

Thorough recovery of both the catalyst and the solvent could be accomplished when 54 g. of the aforesaid lower layer resulting from the extraction was put together with 11 g. of the residue resulting from the distillation of the extracted phase and the resultant mixture was used as the catalyst-solution in the next cycle of reaction.

Analysis showed the catalyst-solution to contain 0.104 mol of the 3-pentenoic acid ester. Recovery of this ester could be effected by circulating the solution to the next cycle of reaction.

EXAMPLE 2

The same autoclave as described in Example 1 was charged with 0.389 mol of butadiene, 0.5 mol of methanol, and 65 g. of the catalyst-solution containing 0.104 mol of 3-pentenoic acid ester recovered in Example 1. Under entirely the same conditions as used in Example 1, the contents of the autoclave were allowed to react for the same length of time. Consequently, the conversion of butadiene was found to be 89%. The reaction mixture contained 0.422 mol of methyl 3-pentenoate. This means that the actual output of the methyl ester of 3-pentenoic acid in this reaction was 0.318 mol, a value obtained by subtracting 0.104 mol (methyl ester already present in the catalyst-solution) from the total 0.422 mol. The yield of the methyl ester of 3-pentenoic acid from butadiene was 82% and the yield (selectivity) of the ester with respect to the converted butadiene was 92%. When the reaction mixture was subjected to extraction using 100 cc. of petroleum ether, 83% of the formed methyl 3-pentenoate entered the upper layer (petroleum ether phase) and 17% of the ester remained in the lower layer. The major portion each of dicobalt octacarbonyl and isoquinoline was contained together with 17% of the methyl 3-pentenoate in the 46 g. lower layer. When the upper layer was distilled, it produced a petroleum ether fraction and a methyl 3-pentenoate fraction while the portion of dicobalt octacarbonyl and isoquinoline which had entered the upper layer remained together with a part of methyl 3-pentenoate in the distillation residue weighing 23 g. The 46 g. of lower layer and the 23 g. of distillation residue were put together to obtain 69 g. of catalyst-solution to be used in the subsequent cycle of reaction. Analysis showed this catalyst-solution to contain 0.154 mol of methyl 3-pentenoate.

EXAMPLE 3

The same autoclave as described in Example 1 was charged with 0.380 mol of butadiene, 0.5 mol of methanol, and 69 g. of the catalyst-solution containing 0.154 mol of methyl 3-pentenoate recovered in Example 2. Under entirely the same conditions, the contents of the autoclave were subjected to reaction for the same length of time. The conversion of butadiene was found to be 74%. The reaction mixture contained 0.414 mol of methyl 3-pentenoate, indicating that the yield of the methyl ester in this reaction was 0.260 mol, a value obtained by subtracting 0.154 mol (methyl ester already present in the catalyst-solution) from the total 0.414 mol. The yield of the methyl ester from butadiene was 68% and the selectivity of the methyl ester with respect to butadiene was 92%. By following the same procedure as in Example 2, there was prepared a catalyst-solution to be used for the next cycle of reaction.

EXAMPLE 4

The same autoclave as described in Example 1 was charged with 0.389 mol of butadiene, 0.5 mol of ethanol, and the catalyst-solution recovered in Example 3. Under 300 atmospheres' pressure of carbon monoxide, the contents of the autoclave were allowed to react at 140° C. for 1.5 hours. The conversion of butadiene was found to be 72%, the yield of 3-pentenoic acid ethyl ester from butadiene to be 58% and the selectivity of the ester with respect to butadiene to be 81% respectively.

EXAMPLE 5

A solution containing 0.27 mol of methanol, 0.27 mol of isoquinoline and 0.016 mol of $Co_2(CO)_8$ was introduced by a pump into an autoclave made of stainless steel, having a capacity of about 100 cc. and fitted with an agitator. Under the pressure of carbon monoxide, the contents of the autoclave was heated to 130° C. and 300 atmospheres. The agitator was set in motion and, at the same time, liquefied butadiene was introduced via the bottom of the reactor into the autoclave by a pump at a fixed rate of 0.054 mol/hr. The reaction was allowed to occur for three hours while the reaction conditions were maintained under constant conditions by the regulation of heater and the controlled feeding of carbon monoxide. At the end of three hours, the introduction of butadiene was discontinued and the reaction mixture was withdrawn through the base of the reactor and assayed for unaltered butadiene and the produced ester of 3-pentenoic acid.

The conversion of butadiene was found to be 92%, the yield of the methyl ester of 3-pentenoic acid from the whole amount of butadiene introduced (0.162 mol) to be 80%, and the selectivity of the ester with respect to the converted butadiene to be 87%. When the reaction mixture was subjected to vacuum distillation at about 50° C., the produced methyl 3-pentenoate and the unaltered methanol were fractionally distilled. The dicobalt octacarbonyl and the isoquinoline were recovered in the form of distillation residue.

EXAMPLE 6

The distillation residue obtained in Example 5 was added to 0.27 mol of methanol. The mixture was introduced by a pump into the same device as described in Example 5. Under entirely the same conditions as used in Example 5, butadiene we fed at a rate of 0.055 mol/hr. for three hours, to allow the contents of the device to undergo reaction.

Consequently, the conversion of butadiene was found to be 94%, the yield of methyl 3-pentenoate based on the whole amount of butadiene introduced to be 84%, and the selectivity of the ester with respect to the converted butadiene to be 89% respectively. The reaction mixture was subjected to vacuum distillation by the same procedure as in Example 5. Thus, the dicobalt octacarbonyl and isoquinoline were covered in the form of distillation residue.

EXAMPLE 7

The distillation residue obtained in Example 6 was dissolved in 0.27 mol of methanol. The solution was introduced by a pump into the same device as described in Example 5. Under entirely the same conditions as used in Example 5, butadiene was introduced at a rate of 0.051 mol/hr. for three hours, to allow the contents of the device to undergo reaction.

Consequently, the conversion of butadiene was found to be 85%, the yield of the methyl ester of 3-pentenoic acid based on the whole amount of butadiene introduced to be 75%, and the selectivity of the ester with respect to the converted butadiene to be 88%.

I claim:

1. In a method for the manufacture of an ester of 3-pentenoic acid by reacting butadiene, carbon monoxide and an alcohol by using cobalt carbonyl as the catalyst in a reaction solvent, the improvement which consists essentially of using isoquinoline as the reaction solvent.

2. The method according to claim 1 wherein the alcohol is a member of the group consisting of methanol, ethanol, propanol and butanol.

3. In a method for the manufacture of an ester of 3-pentenoic acid by reacting butadiene, carbon monoxide and an alcohol by using cobalt carbonyl as the catalyst in a reaction solvent, the improvement which consists essentially of using isoquinoline as the reaction solvent, subjecting the reaction product to extraction with paraffin and obtaining an extracted phase containing the greater part of the ester of 3-pentenoic acid and a minor portion each of isoquinoline and cobalt carbonyl and obtaining a separated phase containing the greater part each of isoquinoline and cobalt carbonyl and a minor portion of the ester of 3-pentenoic acid, distilling the extracted phase to separate the paraffin fraction, 3-pentenoic acid ester fraction as a product and a black viscous residue, using the separated paraffin fraction for the extraction of the reaction product, and using the said black viscous residue together with the separated phase as the raw material for the initial reacting step.

4. In a method for the manufacture of an ester of 3-pentenoic acid by reacting butadiene, carbon monoxide and an alcohol by using cobalt carbonyl as the catalyst in a reaction solvent, the improvement which consists essentially of using isoquinoline as the reaction solvent, subjecting the reaction product to vacuum distillation at a temperature not exceeding about 50° C. thereby obtaining the produced ester of 3-pentenoic acid as a distillation fraction together with a distillation residue composed of isoquinoline and cobalt carbonyl, and using this residue as the raw material for the reaction step.

References Cited

UNITED STATES PATENTS

| | | | |
|---|---|---|---|
| 2,586,341 | 2/1952 | Hyson | 260—533 A |
| 2,820,059 | 1/1958 | Hasek | 260—49 FC |

OTHER REFERENCES

Dupont et al.: Bull. Soc. Chim (France), 15, 929–32 (1948).

LORRAINE A. WEINBERGER, Primary Examiner

P. J. KILLOS, Assistant Examiner

U.S. Cl. X.R.

260—666 B